US006230585B1

(12) United States Patent
Bator

(10) Patent No.: US 6,230,585 B1
(45) Date of Patent: *May 15, 2001

(54) SLIP OVER BRACKET FOR TRANSMISSION SOLENOIDS

(75) Inventor: Bruce C. Bator, Laurinburg, NC (US)

(73) Assignee: Rostra Precision Controls, Inc., Laurinburg, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,776

(22) Filed: Mar. 27, 1998

(51) Int. Cl.$^7$ ............................ F16H 57/02; F16M 11/00; A45D 42/14
(52) U.S. Cl. ........................ 74/606 R; 248/23; 248/363; 248/674; 248/300; 248/200; 137/343
(58) Field of Search .................. 248/200, 300, 248/674, 909; 74/606 R, 866, 529; 137/343; 192/3.57

(56) References Cited

U.S. PATENT DOCUMENTS

| 2,269,947 | * | 1/1942 | Ludwig | 250/33 |
| 4,031,796 | * | 6/1977 | Wilkes | 84/20 |
| 4,097,012 | * | 6/1978 | McIntyre | 248/23 |
| 4,451,309 | * | 5/1984 | Cauldwell | 248/363 |
| 4,524,797 | * | 6/1985 | Lungu | 137/343 |
| 4,842,010 | | 6/1989 | Edgecomb et al. | |
| 4,865,290 | * | 9/1989 | Weeks | 248/674 |
| 4,878,644 | * | 11/1989 | Downing | 248/674 |
| 4,947,968 | * | 8/1990 | Slavin et al. | 192/4 A |
| 4,987,968 | * | 1/1991 | Martus et al. | 180/272 |
| 5,040,316 | | 8/1991 | Fast . | |
| 5,148,720 | | 9/1992 | Swenson, Sr. et al. | |
| 5,289,844 | * | 3/1994 | Stevenson | 137/343 |
| 5,521,795 | * | 5/1996 | Burgett et al. | 361/825 |
| 5,842,384 | * | 12/1998 | Berger | 74/529 |
| 5,853,159 | * | 12/1998 | Gorini et al. | 248/300 |
| 6,006,880 | * | 12/1998 | Daniel | 192/3.57 |

* cited by examiner

Primary Examiner—Vinh T. Luong
(74) Attorney, Agent, or Firm—MacMillan, Sobanski & Todd, LLC

(57) ABSTRACT

A bracket for securing a solenoid to a vehicle transmission includes a clamp portion adapted to reach over and engage an outer end of the solenoid to releasably attach the bracket to the solenoid and secure the solenoid to the transmission. The bracket also includes an anchor portion adapted to attach the bracket to the transmission, and a support structure connecting the clamp portion to the anchor portion.

7 Claims, 11 Drawing Sheets

SLIP OVER BRACKET FOR TRANSMISSION SOLENOIDS

BACKGROUND OF THE INVENTION

This invention relates in general to brackets for use in vehicle transmissions, and in particular to an improved bracket for securing a solenoid to a valve body in a vehicle automatic transmission.

In most vehicles, a transmission is provided in the drive train between the engine and the driven wheels. As is well known, the transmission includes a housing containing an input shaft, an output shaft, and a plurality of gears which can be selectively connected between the input shaft and the output shaft. By controlling the connection of the gears, various forward and reverse gear ratios can be obtained to provide smooth and efficient operation of the vehicle.

In an automatic transmission, the connection of the gears is usually controlled by a hydraulic control system. Typically, the hydraulic control system includes a pump which provides pressurized transmission fluid, and a plurality of valves for controlling the flow of the transmission fluid to control the connection of the gears. The valves are often mounted in a valve body within the transmission housing. In many late-model vehicles, the transmission is controlled electronically by the use of an electronic control unit, various sensors, and solenoids. As the solenoids are turned on and off, they open and close the valves within the transmission to control the connection of the gears.

The solenoids are generally secured to the valve body with brackets. The usual practice is to weld the bracket to the solenoid at the time of manufacture of the solenoid, or to form the bracket as an integral part of the solenoid assembly. The valve bodies for different transmissions have different configurations, and different locations for mounting solenoids on the valve body often have different configurations. Consequently, different solenoid/bracket assemblies are manufactured to accommodate the different transmissions and different valve body locations. The manufacture of many different types of solenoid/bracket assemblies is relatively costly and the inventory expense is relatively high. Also, the welding of the brackets to the solenoids is time consuming and may cause damage to the solenoids. Thus, it would be desirable to provide an improved solenoid bracket which allows more cost efficient manufacture, greater flexibility of manufacture, and less inventory. It would also be desirable to avoid the need for welding the bracket to the solenoid.

SUMMARY OF THE INVENTION

This invention relates to a bracket for securing a solenoid to a valve body in a vehicle automatic transmission. The bracket includes a clamp portion adapted to reach over and engage an outer end of the solenoid to secure the solenoid to the valve body. Preferably, the clamp portion includes a generally circular solenoid attachment portion adapted to engage the outer end of the solenoid. The solenoid attachment portion preferably has a diameter which is approximately the same as the diameter of the outer end of the solenoid. Preferably, a first locating structure is formed on the solenoid attachment portion and a second locating structure is formed on the outer end of the solenoid. The first locating structure is adapted for cooperating with the second locating structure to locate the bracket relative to the solenoid. In one embodiment, the clamp portion also includes a neck portion between the solenoid attachment portion and the remainder of the bracket. The neck portion has sufficient strength to avoid bending under a force of 10 pounds applied against the solenoid attachment portion by the outer end of the solenoid. The bracket also includes an anchor portion adapted for attaching the bracket to the valve body, and a support structure connecting the clamp portion to the anchor portion.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
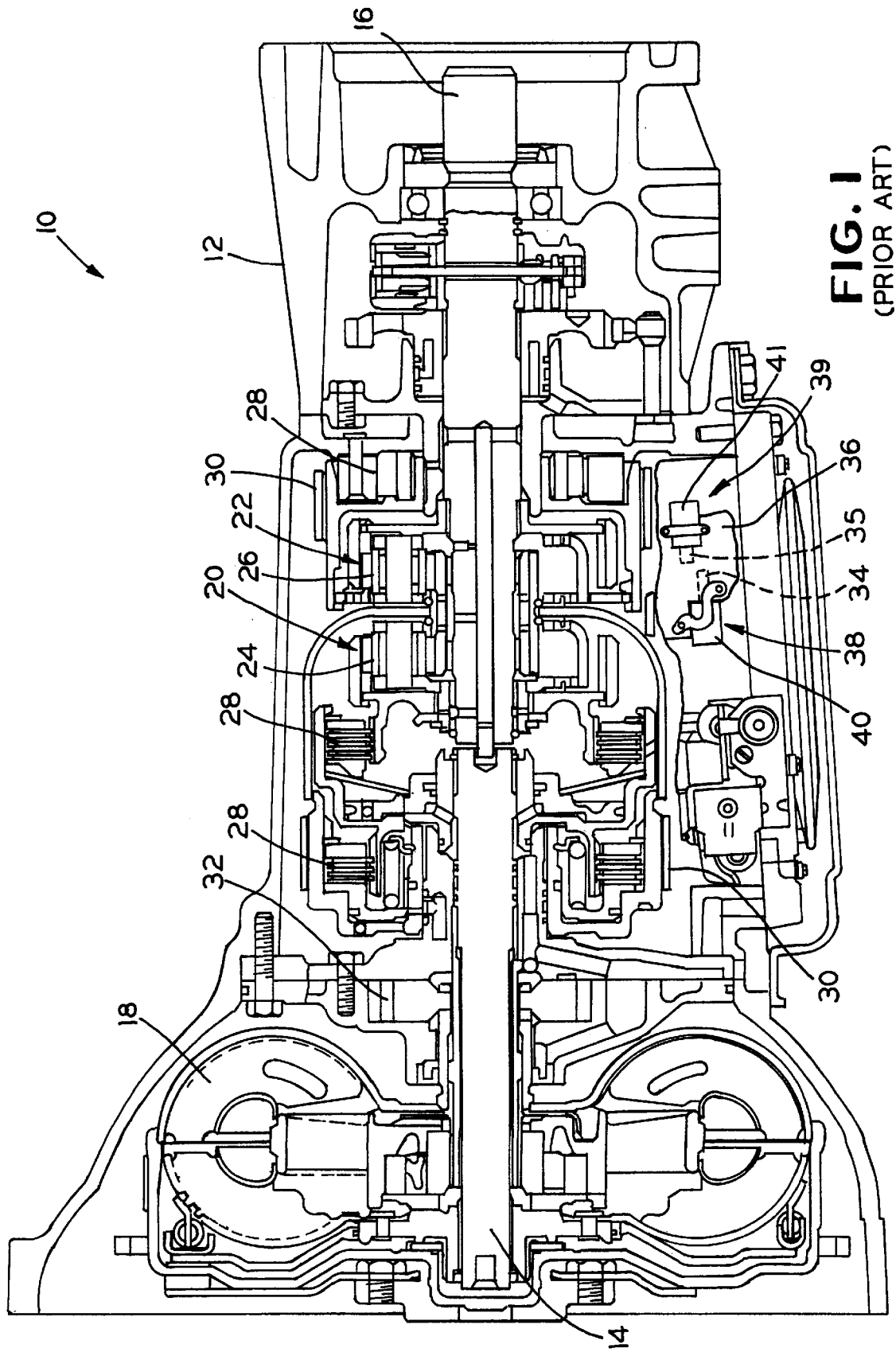
FIG. 1 is a side elevational view in cross section of a prior art vehicle transmission, showing a pair of solenoid/bracket assemblies secured to a valve body.

Referring now to the drawings, there is illustrated in FIG. 1 a prior art vehicle automatic transmission, indicated generally at 10. The transmission 10 is generally conventional in the art and is intended to be representative of any known vehicle automatic transmission structure. As a result, only a brief overview will be given of the structure and operation of the transmission 10.

The transmission 10 includes a case or housing 12. The housing 12 contains an input shaft 14 and an output shaft 16. The input shaft 14 is adapted to be rotatably driven, such as by a conventional internal combustion or diesel engine (not shown). The input shaft 14 is connected to the engine by a fluid coupling called a torque converter 18. The transmission 10 also includes a front planetary gearset 20 and a rear planetary gearset 22. The gearsets 20 and 22 include a plurality of gears 24 and 26 which can be selectively connected between the input shaft 14 and the output shaft 16. By controlling the connection of the gears 24 and 26, various forward and reverse gear ratios can be obtained between the input shaft 14 and the output shaft 16. The transmission 10 includes driving devices called clutches 28, and holding devices called bands 30, which are applied selectively to control the connection of the gears 24 and 26.

The transmission 10 also includes a hydraulic control system which controls the application of the clutches 28 and bands 30. A hydraulic pump 32 supplies pressurized transmission fluid through a series of hydraulic circuits to a plurality of valves (two valves 34 and 35 are shown). Each valve 34 and 35 can be opened to allow the flow of hydraulic fluid to apply an associated clutch 28 or band 30, or closed to stop the flow of hydraulic fluid so that the clutch 28 or band 30 is not applied. The valves 34 and 35 are mounted in a valve body 36. A plurality of solenoid/bracket assemblies (two solenoid/bracket assemblies 38 and 39 are shown) are secured to the valve body 36. The solenoids 40 and 41 of the solenoid/bracket assemblies 38 and 39 are electronically controlled to open and close the valves 34 and 35, respectively.

Figure 2:
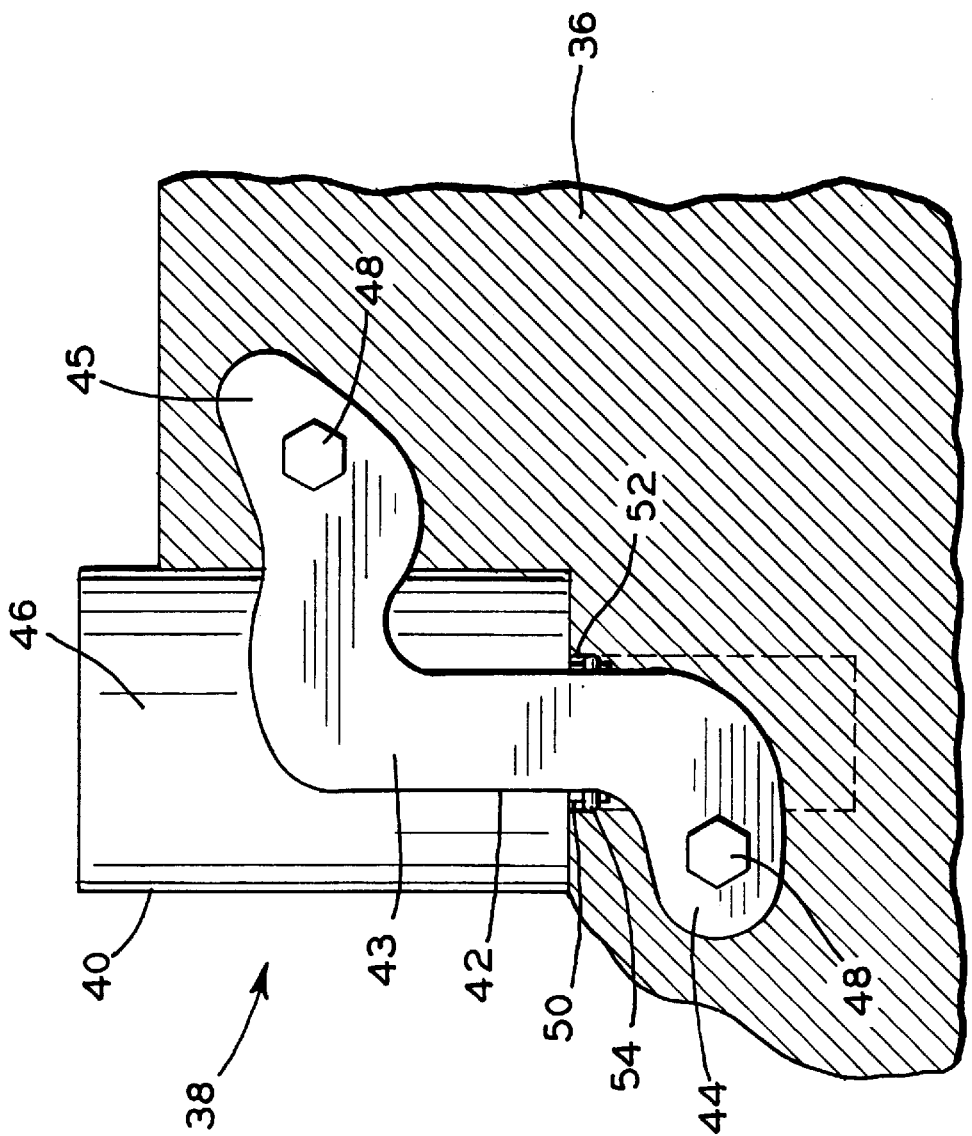
FIG. 2 is a side elevational view in cross section of one of the prior art solenoid/bracket assemblies secured to the valve body.

As shown in FIG. 2, the prior art solenoid/bracket assembly 38 includes a bracket 42 having a central portion 43 and a pair of end portions 44 and 45. The central portion 43 of the bracket 42 is welded to the cylindrical side surface 46 of the solenoid 40. The end portions 44 and 45 of the bracket 42 are secured to the valve body 36 with bolts 48. The solenoid 40 includes a port 50 which extends through an opening 52 in the valve body 36 to allow the flow of transmission fluid between the solenoid 40 and the associated valve 34 (shown schematically). The operation of the solenoid 40 to control the opening and closing of the valve 34 is well known to those skilled in the art An 0-ring 54 is mounted on the inner end of the port 50 to prevent leakage of transmission fluid between the port 50 and the opening 52.

Figure 3:
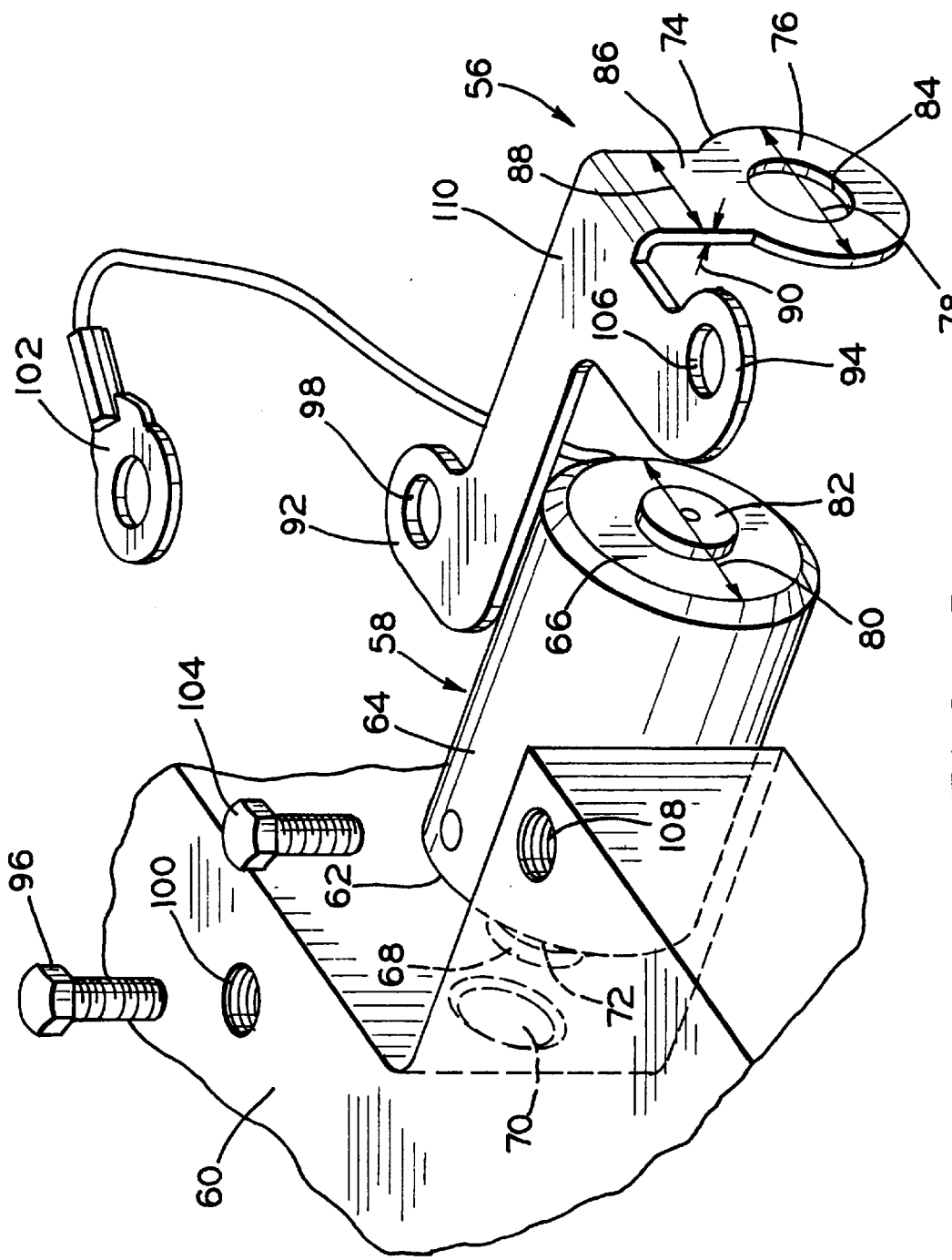
FIG. 3 is a perspective view of a first embodiment of a bracket in accordance with the invention, showing the bracket securing a solenoid to a valve body.

FIG. 3 illustrates a first embodiment of a bracket 56 in accordance with the invention. The bracket 56 is shown securing a solenoid 58 to a valve body 60. The solenoid 58 is generally cylindrical in shape, including a circular inner end 62, a cylindrical side surface 64, and a circular outer end 66. A port 68 is formed on the inner end 62 of the solenoid 58. The port 68 extends through an opening 70 in the valve body 60 to provide fluid communication between the solenoid 58 and an associated valve (not shown). A seal 72 such as an 0-ring is mounted on the inner end of the port 68.

In contrast with the prior art solenoid/bracket assembly 38 illustrated in FIG. 2, the bracket 56 is not fixed to the solenoid 58 by welding or other means. Rather, the bracket 56 and solenoid 58 are maintained as two separate pieces. The bracket 56 is preferably a metallic plate which is cut into a desired shape and bent into a desired configuration. The bracket 56 includes a clamp portion 74 on the outer end of the bracket 56. The clamp portion 74 extends generally perpendicular to the remainder of the bracket 56. When the solenoid 58 and bracket 56 are assembled on the valve body 60, the clamp portion 74 reaches over the outer end 66 of the solenoid 58 to secure the solenoid 58 to the valve body 60. The clamp portion 74 is releasably attached to the solenoid 58, not fixed to the solenoid 58.

The clamp portion 74 includes a solenoid attachment portion 76 adapted to slip over the outer end 66 of the solenoid 58. Preferably, the solenoid attachment portion 76 is generally circular in shape, and has a diameter 78 which is approximately the same as the diameter 80 of the outer end 66 of the solenoid 58. During operation of the transmission, the pressurized transmission fluid applies an outward force on the solenoid 58, which in turn applies an outward force on the bracket 56. By constructing the solenoid attachment portion 76 to have approximately the same size and shape as the outer end 66 of the solenoid 58, the force applied on the bracket 56 is spread out so that the bracket 56 is better able to withstand the force.

Preferably, the solenoid attachment portion 76 of the bracket 56 and the outer end 66 of the solenoid 58 include cooperating locating structures to locate the position of the bracket 56 relative to the solenoid 58. In the illustrated embodiment, a locating post 82 is formed on the outer end 66 of the solenoid 58, and a locating hole 84 adapted for receiving the locating post 82 is formed in the solenoid attachment portion 76 of the bracket 56. The locating hole 84 has approximately the same size as the locating post 82 so that it receives the locating post 82 in a firm fit. The locating hole 84 and the locating post 82 are preferably circular in shape and centrally located, respectively, in the solenoid attachment portion 76 of the bracket 56 and the outer end 66 of the solenoid 58.

The clamp portion 74 of the illustrated bracket 56 also includes a neck portion 86 between the solenoid attachment portion 76 and the remainder of the bracket 56. The width 88 of the neck portion 86 is less than the diameter 78 of the solenoid attachment portion 76. As discussed above, the pressurized transmission fluid applies an outward force on the solenoid 58 during operation of the transmission. In turn, the solenoid 58 applies an outward force on the bracket 56, specifically the solenoid attachment portion 76 of the bracket 56. The force on the bracket 56 is greater than in the prior art solenoid/bracket assembly 38 because the bracket 56 engages the outer end 66 of the solenoid 58 instead of being welded to the side surface 64 of the solenoid 58, thereby increasing the lever arm on the bracket 56. If the neck portion 86 of the bracket 56 was not strong enough, it could be bent outward by this force and the attachment of the solenoid 58 to the valve body 60 could loosen. If the neck portion 86 was bent outward too much, transmission fluid could leak through the opening 70 of the valve body 60, resulting in the loss of transmission function.

Accordingly, the neck portion 86 of the bracket 56 is constructed so that it has sufficient strength to avoid bending under a force of 10 pounds applied to the center of the solenoid attachment portion 76, and sufficient strength to avoid the loss of transmission function under a force of 25 pounds. The neck portion 86 preferably has a width 88 of at least about ⅜ inch, and more preferably between about ⅜ inch and about ½ inch. The neck portion 86 preferably has a thickness 90 of at least about 0.060 inch, and more preferably between about 0.060 inch and about 0.075 inch. The material used to form the neck portion 86 preferably has a yield strength of at least about 30,000 psi. A preferred material to form the neck portion 86 and the entire bracket 56 is a high strength steel such as ASTM A607, Grade 50 steel. The bracket 56 has sufficient strength to withstand repeated operation of the transmission without fatigue, fracture or bending.

The bracket 56 also includes first and second anchor portions 92 and 94 for attaching the bracket 56 to the valve body 60. The first anchor portion 92 is formed on an inner end of the bracket 56, and is adapted for attachment to the valve body 60 at a location near the inner end 62 of the solenoid 58. A threaded fastener 96 such as a bolt is inserted through an unthreaded aperture 98 in the bracket 56 into a threaded aperture 100 in the valve body 60 to attach the first anchor portion 92 to the valve body 60. A ground wire 102 from the solenoid 58 can also be attached to the valve body 60 at this location. The second anchor portion 94 is formed on an outer end of the bracket 56, and is adapted for attachment to the valve body 60 at a location near the outer end 66 of the solenoid 58. A threaded fastener 104 such as a bolt is inserted through an unthreaded aperture 106 in the bracket 56 into a threaded aperture 108 in the valve body 60 to attach the second anchor portion 94 to the valve body 60. The first and second anchor portions 92 and 94 are attached at opposite ends of the solenoid 58 and on opposite sides of the solenoid 58 to balance the bracket 56 relative to the solenoid 58.

The bracket 56 further includes a support structure 110 connecting the clamp portion 74 to the anchor portions 92 and 94. The support structure 110 is usually a central portion of the bracket 56. In the illustrated embodiment, the support structure 110 extends coplanar with the anchor portions 92 and 94, and generally parallel with the side surface 64 of the solenoid 58.

During assembly, the solenoid 58 is first mounted on the valve body 60, with the inner end 62 of the solenoid 58 abutting the valve body 60 and the port 68 extending through the opening 70 into the valve body 60. Then the bracket 56 is placed over the solenoid 58 and attached to the valve body 60. The clamp portion 74 of the bracket 56 reaches over the outer end 66 of the solenoid 58 to secure the solenoid 58 to the valve body 60. The bracket 56 is sized relative to the solenoid 58 so that it tightly secures the solenoid 58 to the valve body 60. The bracket 56 prevents the solenoid 58 from moving during operation of the transmission, thereby preventing the leakage of transmission fluid. The separate solenoid 58 and bracket 56 are easier to install than the prior art solenoid/bracket assembly 38.

Figure 4:
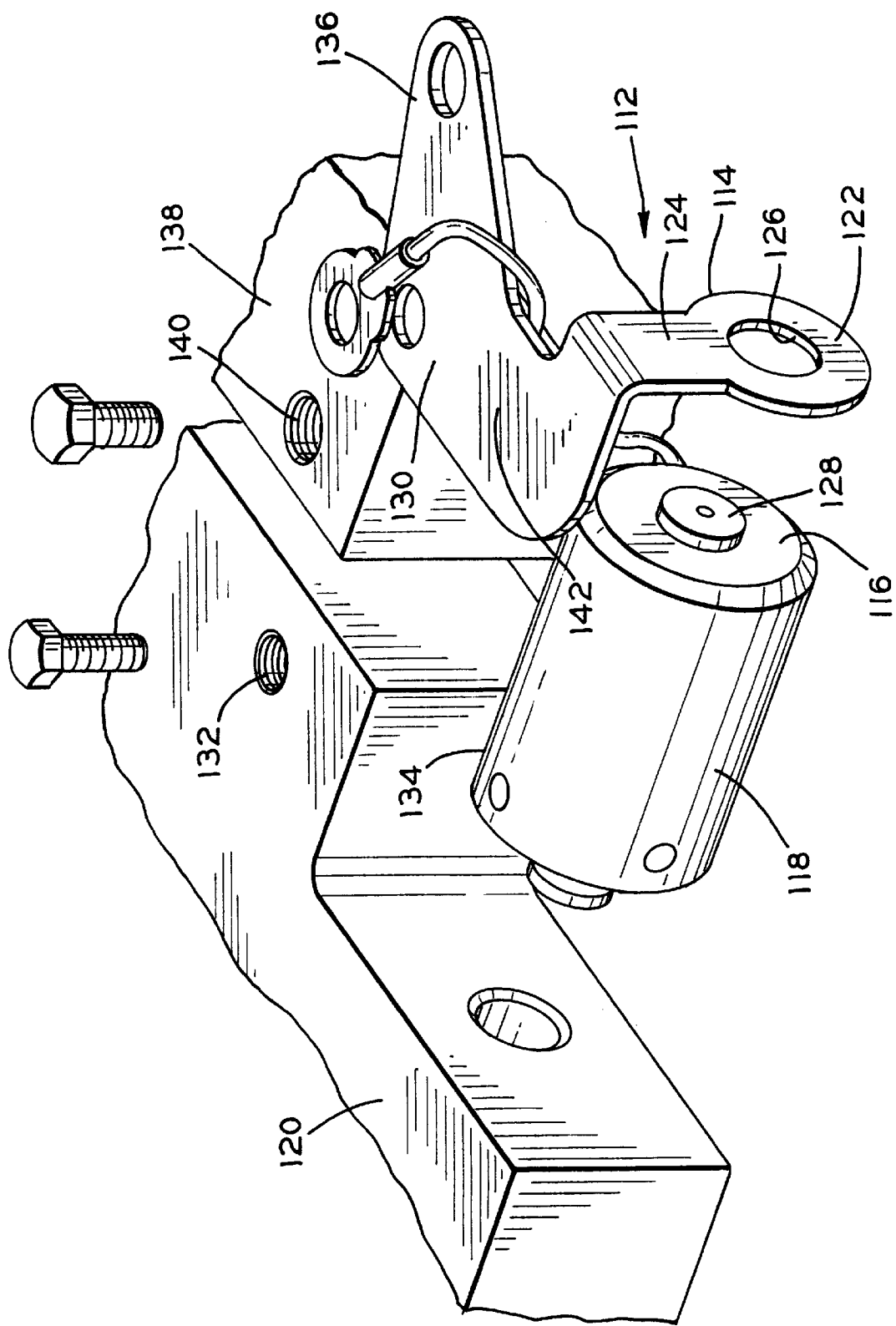
FIG. 4 is a perspective view of a second embodiment of a bracket in accordance with the invention, showing the bracket securing a solenoid to a valve body.

FIG. 4 illustrates a second embodiment of a bracket 112 in accordance with the invention. The bracket 112 includes a clamp portion 114 adapted to reach over and engage an outer end 116 of a solenoid 118 to secure the solenoid 118 to a valve body 120. The clamp portion 114 includes a solenoid attachment portion 122 and a neck portion 124. The solenoid attachment portion 122 has a locating hole 126 adapted for receiving a locating post 128 on the solenoid 118 to locate the bracket 112 relative to the solenoid 118. The bracket 112 also includes a first anchor portion 130 for attaching the bracket 112 to the valve body 120. The first anchor portion 130 is adapted for attachment at a location 132 near the side surface 134 of the solenoid 118. The bracket 112 also includes a second anchor portion 136 for attaching the bracket 112 to the housing 138 of the transmission. The second anchor portion 136 is adapted for attachment at a location 140 some distance to the side and outward from the solenoid 118. The bracket 112 further includes a support structure 142 connecting the clamp portion 114 to the anchor portions 130 and 136. The support structure 142 extends to the side and outward from the clamp portion 114 to reach the anchor portions 130 and 136.

Figure 5:
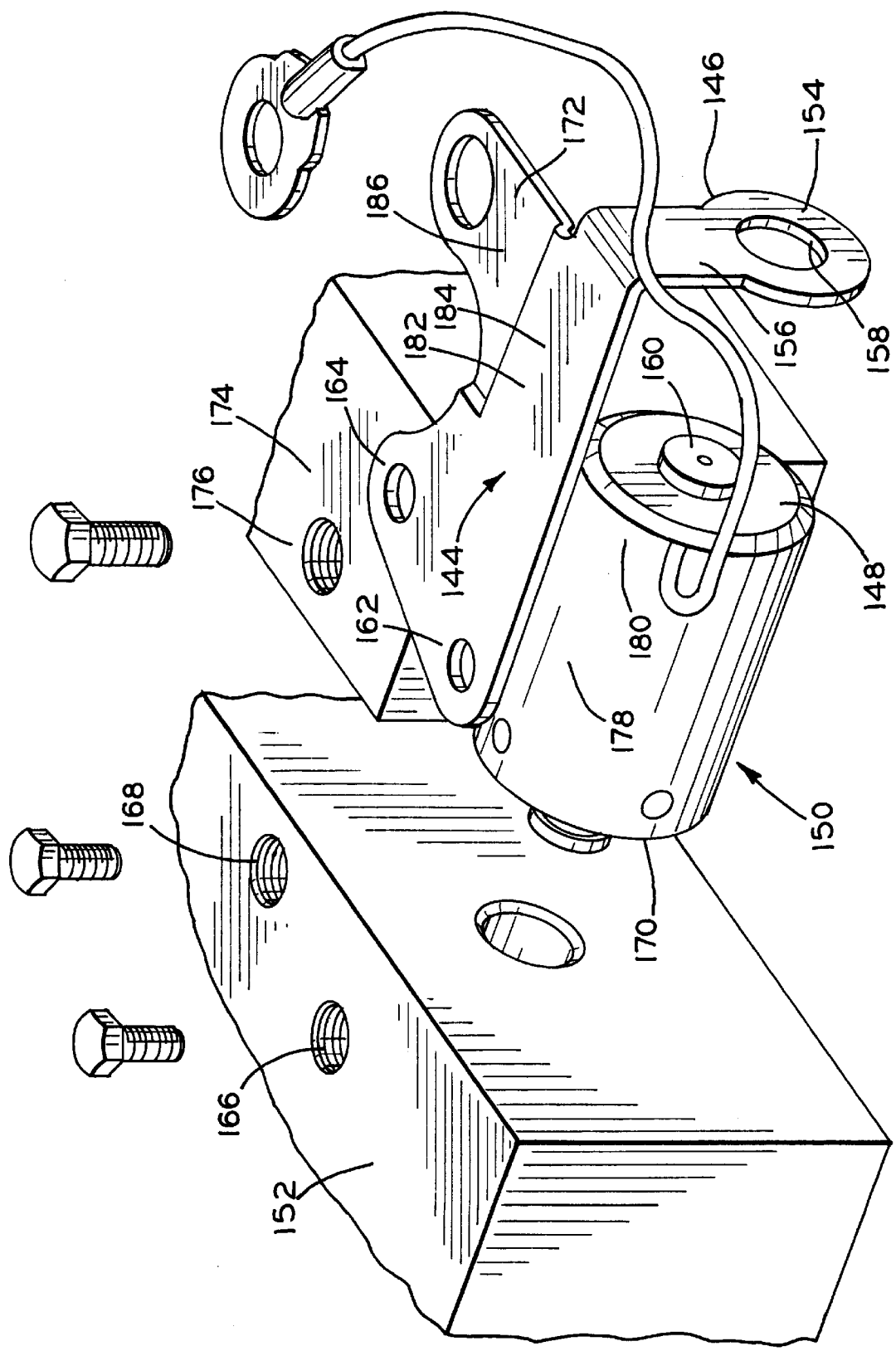
FIG. 5 is a perspective view of a third embodiment of a bracket in accordance with the invention, showing the bracket securing a solenoid to a valve body.

FIG. 5 illustrates a third embodiment of a bracket 144 in accordance with the invention. The bracket 144 includes a clamp portion 146 adapted to reach over and engage an outer end 148 of a solenoid 150 to secure the solenoid 150 to a valve body 152. The clamp portion 146 includes a solenoid attachment portion 154 and a neck portion 156. The solenoid attachment portion 154 has a locating hole 158 adapted for receiving a locating post 160 on the solenoid 150 to locate the bracket 144 relative to the solenoid 150. The bracket 144 also includes first and second anchor portions 162 and 164 for attaching the bracket 144 to the valve body 152. The first and second anchor portions 162 and 164 are adapted for attachment at locations 166 and 168 near the inner end 170 of the solenoid 150, on opposing sides of the solenoid 150. The bracket 144 also includes a third anchor portion 172 for attaching the bracket 144 to the housing 174 of the transmission. The third anchor portion 172 is adapted for attachment at a location 176 near the side surface 178 of the solenoid 150 at the outer end 180 of the solenoid 150. The bracket 144 further includes a support structure 182 connecting the clamp portion 146 to the anchor portions 162, 164 and 172. The support structure 182 includes a first support portion 184 which extends coplanar with the first and second anchor portions 162 and 164, and generally parallel with the side surface 178 of the solenoid 150. The support structure 182 also includes a second support portion 186 which extends coplanar with the third anchor portion 172. The second support portion 186 is slightly recessed from the first support portion 184 to accommodate the position of the attachment location 176 on the transmission housing 174.

Figure 6:
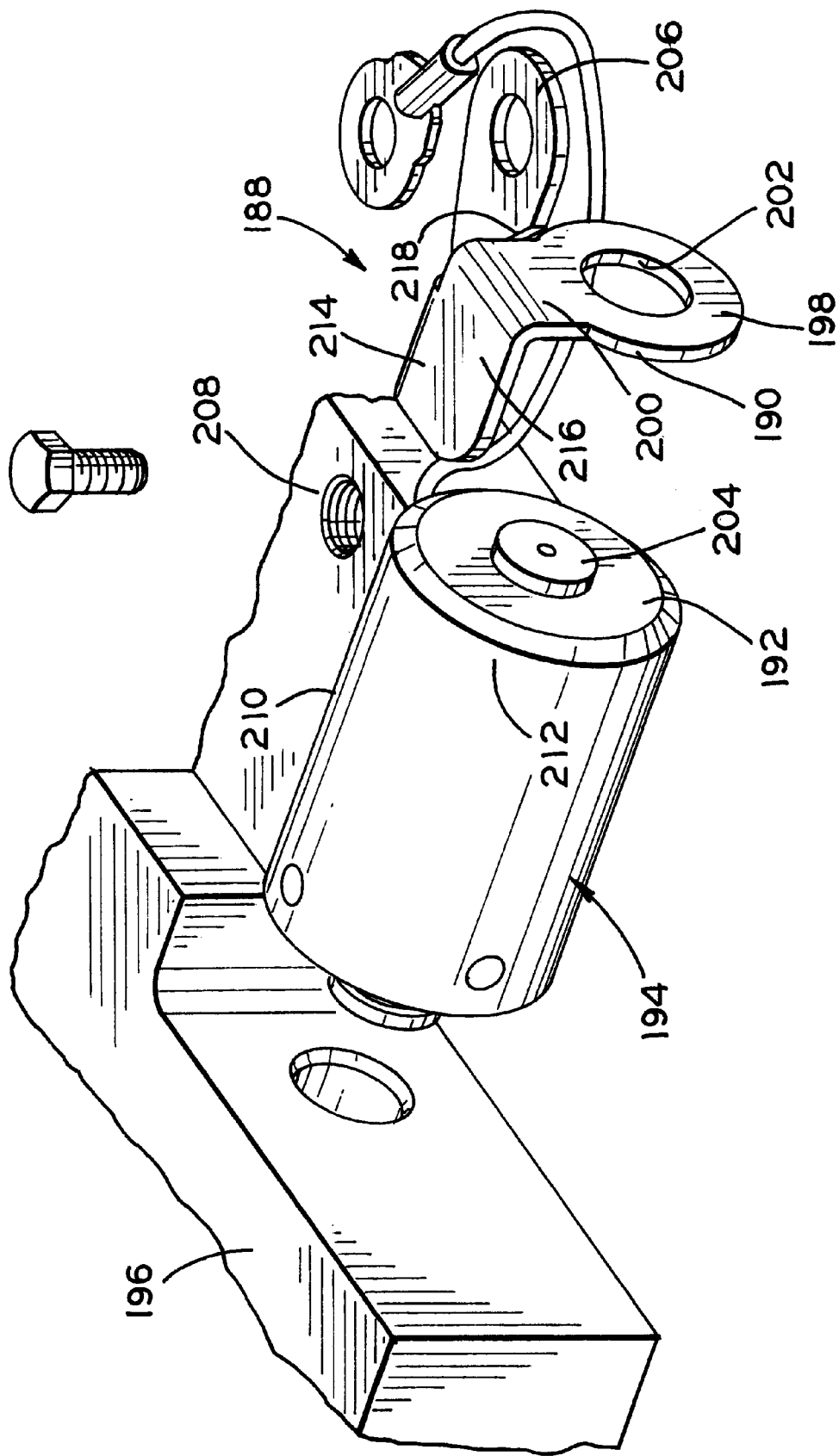
FIG. 6 is a perspective view of a fourth embodiment of a bracket in accordance with the invention, showing the bracket securing a solenoid to a valve body.

FIG. 6 illustrates a fourth embodiment of a bracket 188 in accordance with the invention. The bracket 188 includes a clamp portion 190 adapted to reach over and engage an outer end 192 of a solenoid 194 to secure the solenoid 194 to a valve body 196. The clamp portion 190 includes a solenoid attachment portion 198 and a neck portion 200. The solenoid attachment portion 198 has a locating hole 202 adapted for receiving a locating post 204 on the solenoid 194 to locate the bracket 188 relative to the solenoid 194. The bracket 188 also includes an anchor portion 206 for attaching the bracket 188 to the valve body 196. The anchor portion 206 is adapted for attachment at a location 208 near the side surface 210 of the solenoid 194 at the outer end 212 of the solenoid 194. The bracket 188 further includes a support structure 214 connecting the clamp portion 190 to the anchor portion 206. The support structure 214 includes a clamp support portion 216 adjacent to the clamp portion 190 of the bracket 188, and extending inward from the clamp portion 190 along the side surface 210 of the solenoid 194. The support structure 214 also includes an anchor support portion 218 adjacent to the anchor portion 206 of the bracket 188. The anchor support portion 218 extends downward from and to the side of the clamp support portion 216 to accommodate the position of the attachment location 208 on the valve body 196.

Figure 7:
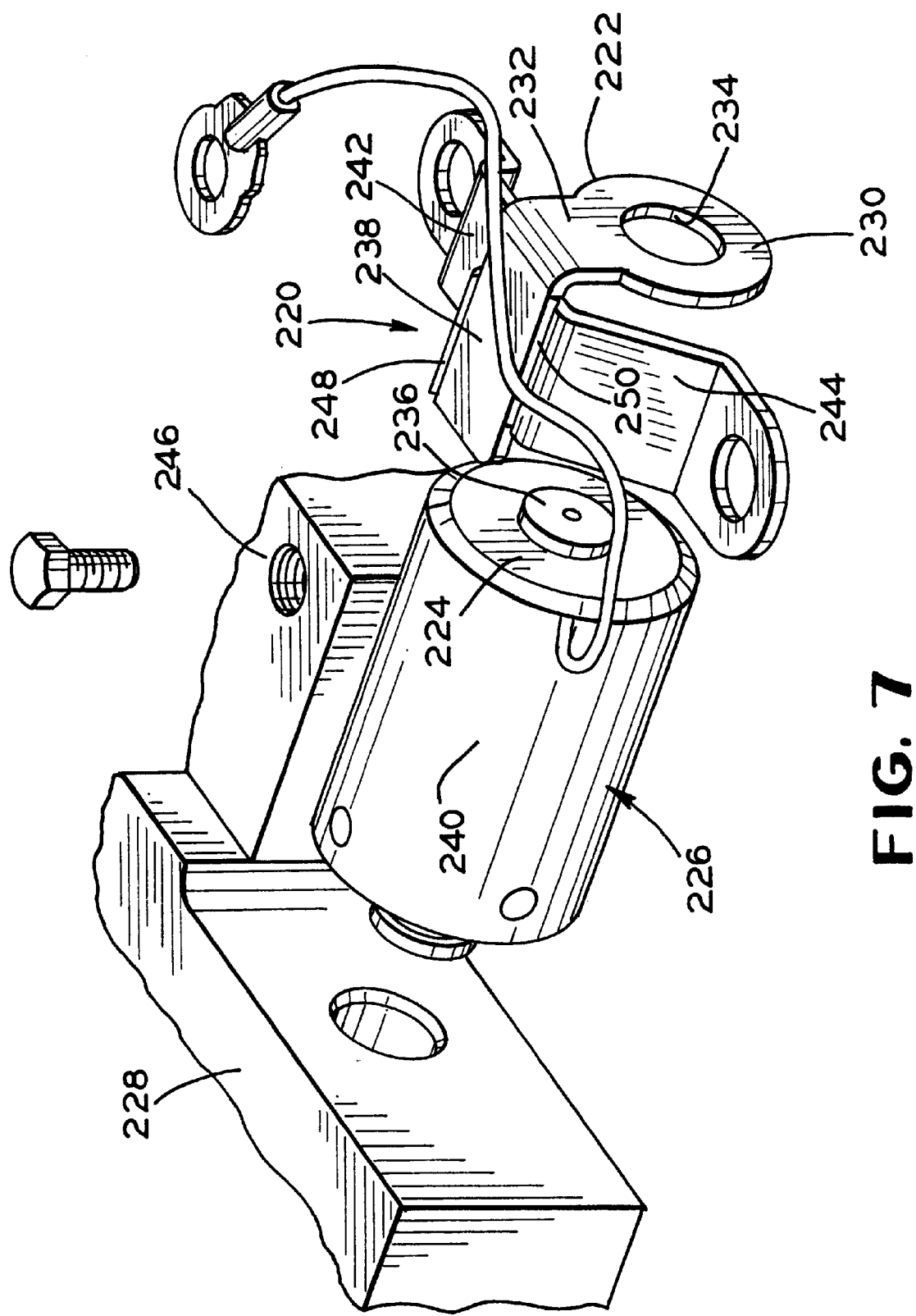
FIG. 7 is a perspective view of a fifth embodiment of a bracket in accordance with the invention, showing the bracket securing a solenoid to a valve body.

FIG. 7 illustrates a fifth embodiment of a bracket 220 in accordance with the invention. The bracket 220 includes a clamp portion 222 adapted to reach over and engage an outer end 224 of a solenoid 226 to secure the solenoid 226 to a valve body 228. The clamp portion 222 includes a solenoid attachment portion 230 and a neck portion 232. The solenoid attachment portion 230 has a locating hole 234 adapted for receiving a locating post 236 on the solenoid 226 to locate the bracket 220 relative to the solenoid 226. The bracket 220 also includes a support structure 238 which extends inward from the clamp portion 222 along the side surface 240 of the solenoid 226.

The bracket 220 further includes first and second anchor appendages 242 and 244 which are detachably secured to the support structure 238 of the bracket 220. Depending on the structure of the valve body 228, one of the anchor appendages 242 or 244 may be used for attaching the bracket 220 to the valve body 228 while the other anchor appendage 242 or 244 is detached from the bracket 220. In the illustrated embodiment, the first anchor appendage 242 is used for attaching the bracket 220 to the valve body 228 at a location 246 near the side surface 240 of the solenoid 226, while the second anchor appendage 244 may be detached from the bracket 220. The detachable anchor appendages 242 and 244 allow the bracket 220 to fit any one of a group of valve bodies having different structures. Preferably, the anchor appendages 242 and 244 are adapted to be detached from the bracket 220 with hand tools. Score lines 248 and 250 are provided between the anchor appendages 242 and 244 and the remainder of the bracket 220, so that the anchor appendages 242 and 244 can be detached from the bracket 220 by breaking them off at the score lines 248 and 250.

Figure 8:
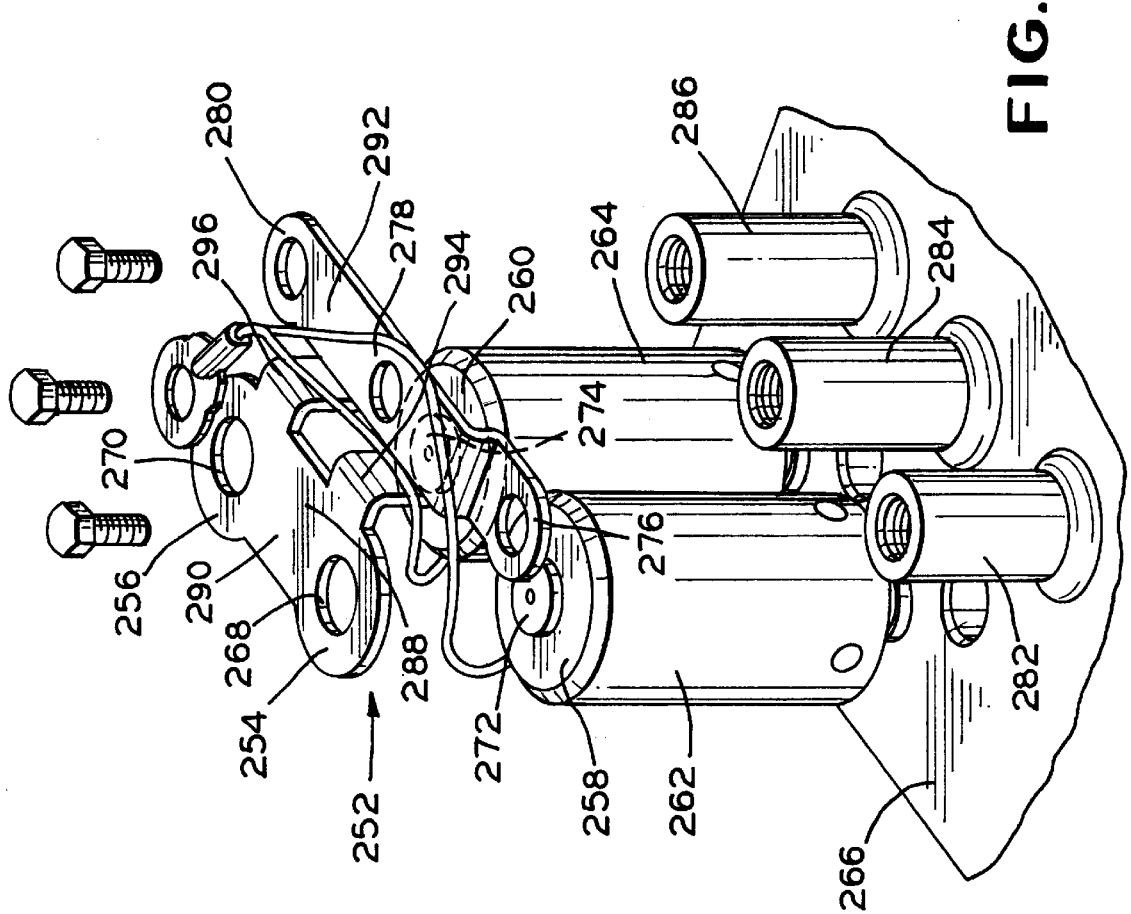
FIG. 8 is a perspective view of a sixth embodiment of a bracket in accordance with the invention, showing the bracket securing a pair of solenoids to a valve body.

FIG. 8 illustrates a sixth embodiment of a bracket 252 in accordance with the invention. The bracket 252 includes first and second clamp portions 254 and 256 adapted to reach over and engage the outer ends 258 and 260 of first and second solenoids 262 and 264 to secure the solenoids 262 and 264 to a valve body 266. The clamp portions 254 and 256 have locating holes 268 and 270 adapted for receiving locating posts 272 and 274 on the solenoids 262 and 264 to locate the bracket 252 relative to the solenoids 262 and 264. The bracket 252 also includes first, second and third anchor portions 276, 278 and 280 for attaching the bracket 252 to first, second and third mounting posts 282, 284 and 286 on the valve body 266. The bracket 252 further includes a support structure 288 connecting the clamp portions 254 and 256 to the anchor portions 276, 278 and 280. The support structure 288 includes a clamp support portion 290 adjacent to the clamp portions 254 and 256 of the bracket 252, and an anchor support portion 292 adjacent to the anchor portions 276, 278 and 280 of the bracket 252. The anchor support portion 292 is positioned inward from the clamp support portion 290 to accommodate the position of the mounting posts 282, 284 and 286 relative to the outer ends 258 and 260 of the solenoids 262 and 264. The support structure 288 includes a pair of links 294 and 296 to attach the anchor support portion 292 to the clamp support portion 290.

Figure 9:
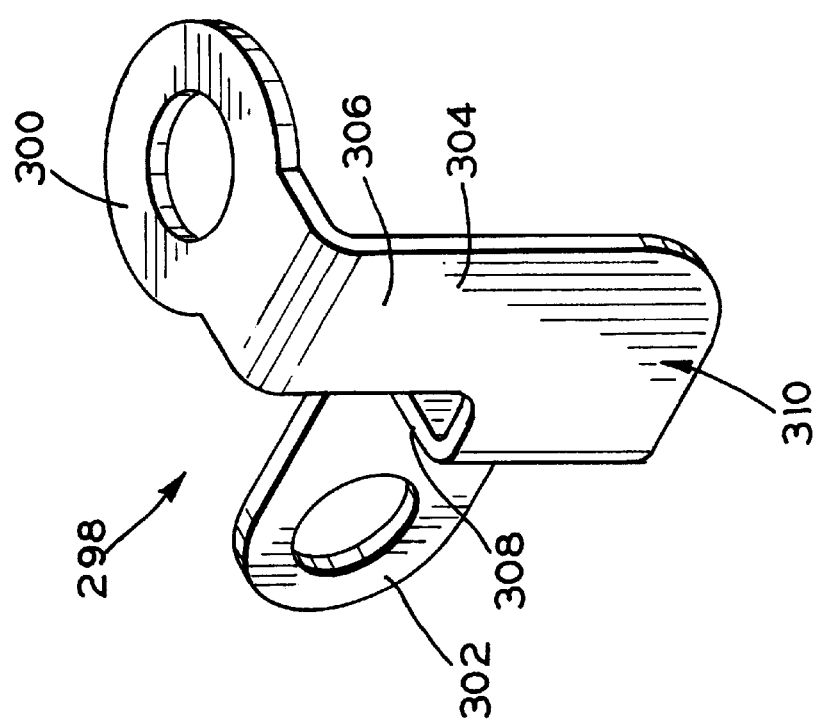
FIG. 9 is a perspective view of a seventh embodiment of a bracket in accordance with the invention.

FIG. 9 illustrates a seventh embodiment of a bracket 298 in accordance with the invention. The bracket 298 includes a clamp portion 300 and an anchor portion 302. The bracket 298 also includes a support structure 304 including a clamp support portion 306 and an anchor support portion 308. Each portion of the bracket is generally perpendicular to the adjacent portion. The illustrated bracket 298 includes a label 310 to identify the type of solenoid to be secured to the valve body, and the location on the valve body at which the solenoid is to be secured. The separate bracket and solenoid of the invention make this labeling advantageous. If the wrong type of solenoid is installed, the transmission will not operate properly.

Figure 10:
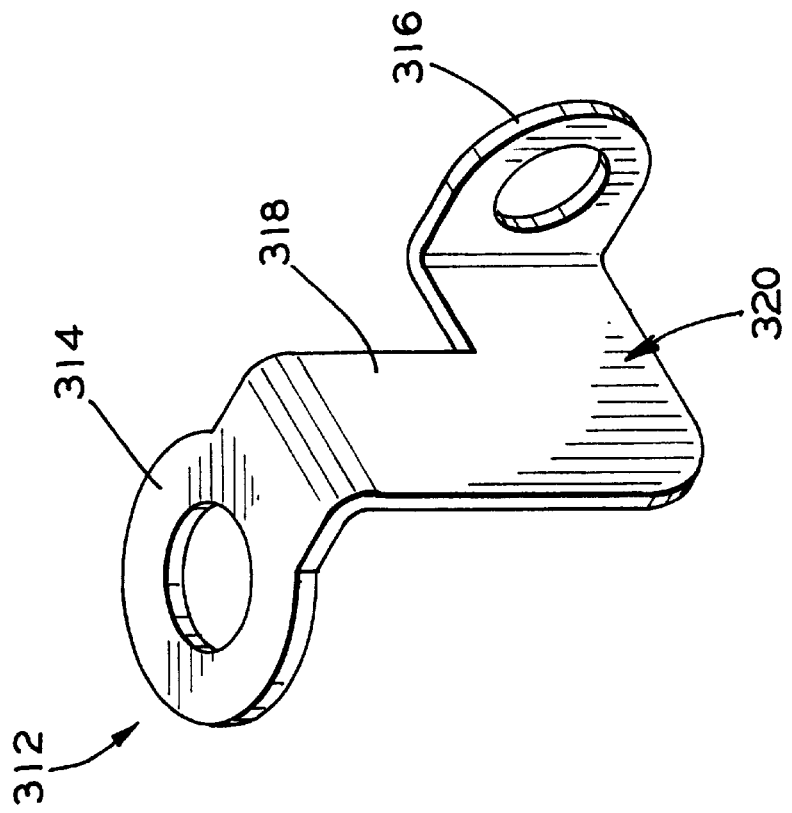
FIG. 10 is a perspective view of an eighth embodiment of a bracket in accordance with the invention.

FIG. 10 illustrates an eighth embodiment of a bracket 312 in accordance with the invention. The bracket 312 includes a clamp portion 314, an anchor portion 316, and a support structure 318 connecting the clamp portion 314 to the anchor portion 316. Each portion of the bracket is generally perpendicular to the adjacent portion. The illustrated bracket 312 includes a label 320 to identify the type of solenoid to be secured to the valve body, and the location on the valve body at which the solenoid is to be secured.

Figure 11:
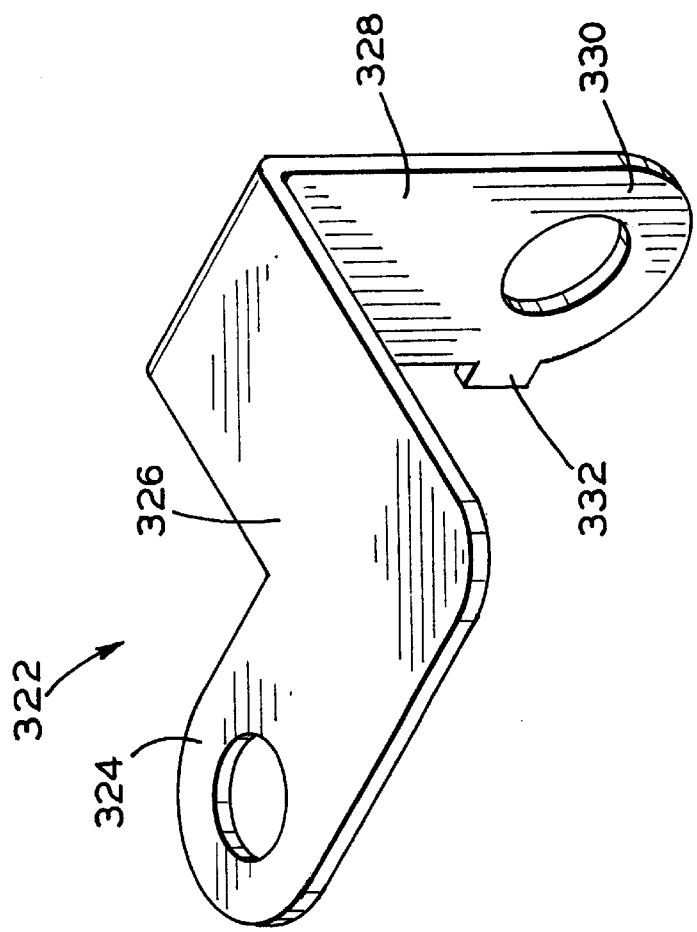
FIG. 11 is a perspective view of a ninth embodiment of a bracket in accordance with the invention

FIG. 11 illustrates a ninth embodiment of a bracket 322 in accordance with the invention. The bracket 322 includes a clamp portion 324, and a generally L-shaped clamp support portion 326 extending coplanar with the clamp portion 324. The bracket 322 further includes an anchor support portion 328 extending perpendicular to the clamp support portion 326, and an anchor portion 330 extending coplanar with the anchor support portion 328. The anchor portion 330 includes a key 332 adapted to fit into a corresponding notch in the valve body to locate the anchor portion 330 relative to the valve body.

Figure 12:
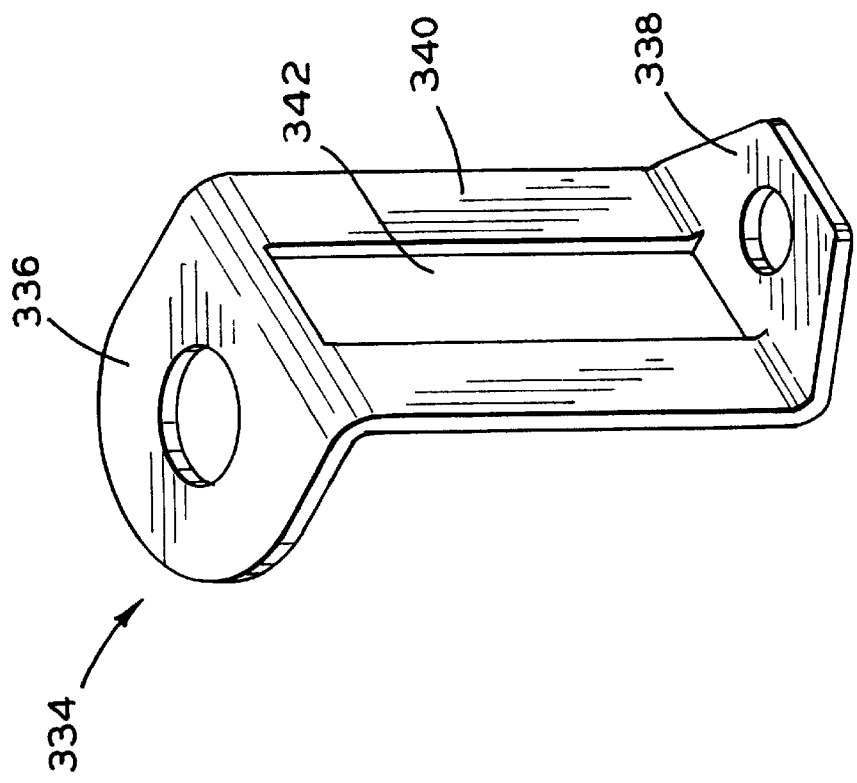
FIG. 12 is a perspective view of a tenth embodiment of a bracket in accordance with the invention.

FIG. 12 illustrates a tenth embodiment of a bracket 334 in accordance with the invention. The bracket 334 includes a clamp portion 336, an anchor portion 338, and a support structure 340 connecting the clamp portion 336 to the anchor portion 338. The support structure 340 is formed with a shallow longitudinal groove 342 to increase the strength of the support structure 340.

Figure 13:
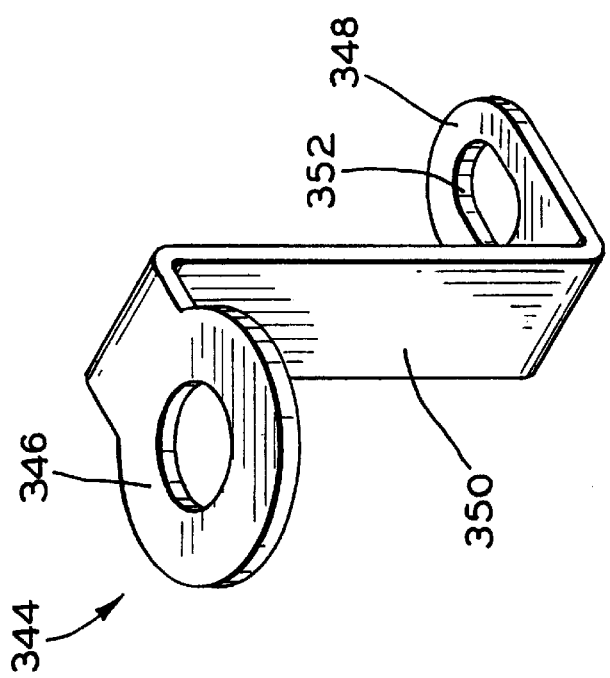
FIG. 13 is a perspective view of an eleventh embodiment of a bracket in accordance with the invention.

FIG. 13 illustrates an eleventh embodiment of a bracket 344 in accordance with the invention. The bracket 344 includes a clamp portion 346, an anchor portion 348, and a support structure 350 connecting the clamp portion 346 to the anchor portion 348. The anchor portion 348 includes a slotted aperture 352 which allows some flexibility in positioning the bracket 344 relative to a valve body.

Figure 14:
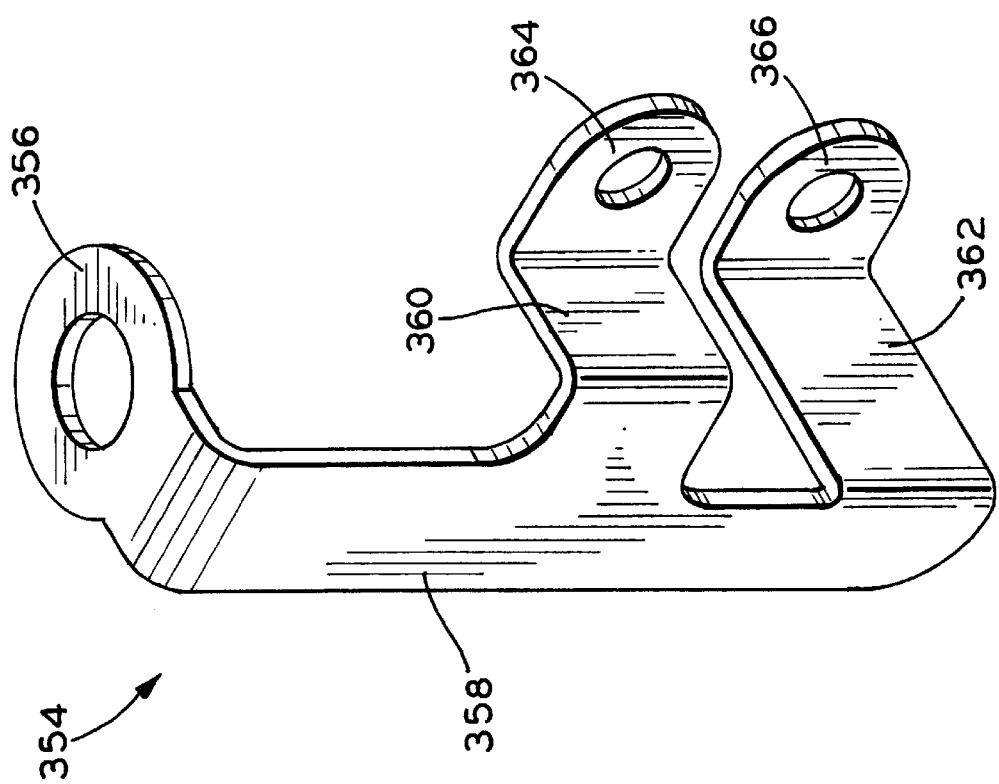
FIG. 14 is a perspective view of a twelfth embodiment of a bracket in accordance with the invention.

FIG. 14 illustrates a twelfth embodiment of a bracket 354 in accordance with the invention. The bracket 354 includes a clamp portion 356, a relatively long clamp support portion 358, a pair of anchor support portions 360 and 362 extending as legs from the clamp support portion 358, and a pair of anchor portions 364 and 366 on the ends of the anchor support portions 360 and 362.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the bracket of the invention has been illustrated securing a solenoid to a valve body in a vehicle automatic transmission, it is recognized that the solenoids are sometimes located at other positions either inside or outside the transmission housing. For example, the solenoids may be mounted on the inner surface of the transmission housing. Accordingly, the bracket of the invention can be used for securing the solenoid at any such location of the transmission.

What is claimed is:

1. A transmission comprising:

an input shaft;

an output shaft;

a plurality of gears selectively connectable between said input shaft and said output shaft;

a hydraulic control system for connecting selective ones of said plurality of gears between said input shaft and said output shaft, said hydraulic control system including a valve body containing a valve; and a solenoid and bracket assembly for controlling the operation of said valve, said solenoid and bracket assembly including a solenoid connected to operate said valve and a bracket for retaining said solenoid in abutment with said valve body, said bracket including an anchor portion releasably secured to said valve body and a clamp portion extending over and abutting, but not secured to, said solenoid to retain said solenoid in abutment with said valve body.

2. The transmission defined in claim 1 wherein said solenoid includes a locating structure, and wherein said clamp portion of said bracket includes a solenoid attachment portion that extends over and abuts, but is not secured to, said locating structure of said solenoid.

3. The transmission defined in claim 2 wherein said solenoid attachment portion has an aperture formed therethrough that receives said locating structure.

4. The transmission defined in claim 3 wherein said locating structure and said aperture formed through said solenoid attachment portion are complementary in shape.

5. The transmission defined in claim 3 wherein said locating structure is circular in shape, and wherein said aperture formed through said solenoid attachment portion is circular in shape.

6. The transmission defined in claim 5 wherein said locating structure defines a first diameter, and wherein said aperture defines a second diameter that is slightly larger than said first diameter.

7. The transmission defined in claim 2 wherein said clamp portion of said bracket includes a support structure, a solenoid attachment portion that extends over and abuts, but is not secured to, said solenoid, and a neck portion extending between said solenoid attachment portion and said support structure.

* * * * *